April 13, 1943.    E. E. SIMMONS, JR    2,316,203
STRAIN RESPONSIVE APPARATUS
Original Filed Feb. 23, 1940
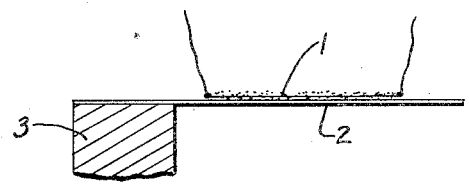
INVENTOR
EDWARD E. SIMMONS JR.
BY
ATTORNEY Patented Apr. 13, 1943

2,316,203

UNITED STATES PATENT OFFICE 2,316,203

STRAIN RESPONSIVE APPARATUS

Edward E. Simmons, Jr., Pasadena, Calif.

Original application February 23, 1940, Serial No. 320,327, now Patent No. 2,292,549, dated August 11, 1942. Divided and this application July 1, 1942, Serial No. 449,297

3 Claims. (Cl. 201—63)

This invention relates generally to strain responsive apparatus and more particularly to an improved dynamometer. This application is a division of my copending application Serial No. 320,327, filed February 23, 1940, now Patent No. 2,292,549, issued Aug. 11, 1942.

It is an object of my invention to provide an improved dynamometer that is relatively simple and economical in construction, operation and maintenance as well as being compact and rugged combined with a high degree of sensitivity, accuracy and reliability. The term dynamometer as used herein broadly refers to the combination of a member to which a force is applied and means responsive to the strain imposed in said member as a result of the applied force.

Other objects and advantages will be more apparent to those skilled in the art from the following description of the accompanying drawing which is a side elevation of my improved dynamometer.

My improved dynamometer consists of a cotton insulated strand or filament 1 of continuous solid electrical conducting material cemented throughout its effective length to a flat piece of flexible steel 2. This device may be calibrated by bending the flexible steel with a given force and noting the change in electrical resistance of the filament 1, this change in resistance being in response to a given strain or deformation of the flexible piece 2. This flexible piece is preferably in the form of a cantilever anchored at its fixed end to a rigid member 3 while its outer end is free. The filament is connected to any suitable measuring circuit such as a Wheatstone bridge to form one arm of the bridge thereby to measure the change of resistance of the filament in accordance with unbalance of the bridge caused by flexure of the cantilever. The material of which the filament is made, its diameter and the cementing or bonding mtaerial are all described in my said copending original application, as well as the probable theory on which the filament operates under the influence of being firmly bonded throughout its effective length. Therefore, it is not deemed necessary to describe such materials or characteristics in this present application. All other characteristics and qualities incident to the present invention and described in said copending application are likewise to be considered as embodied in my present disclosure.

From the foregoing disclosure, it is seen that the dynamometer disclosed herein provides an extremely simple, direct, rugged and compact means for measuring the force applied to the cantilever beam and these qualities are combined with a high degree of sensitivity, accuracy, freedom from hysteresis and ability to reproduce its results faithfully.

It will of course be understood that various changes in details of construction and arrangement of parts may be made by those skilled in the art without departing from the spirit of the invention as set forth in the appended claims.

I claim:

1. A bending element having a continuous solid filament of material whose electrical resistance varies in accordance with its strain bonded throughout its effective length to said element to produce a variable resistance upon bending of said element.

2. A dynamometer comprising a flexible cantilever member normally fixed at one end and adapted to have free movement at its other end, and a continuous solid filament of material whose electrical resistance varies in accordance with its strain bonded throughout its effective length to asid member, whereby flexure of said member upon application of force to its free end varies the strain in said member and accordingly changes the electrical resistance of said filament.

3. The combination set forth in claim 2 further characterized in that said filament is bonded throughout its effective length to the surface of said member in a direction lengthwise thereof.

EDWARD E. SIMMONS, JR.